US012743940B1

(12) United States Patent
Auricchio

(10) Patent No.: US 12,743,940 B1
(45) Date of Patent: Sep. 22, 2026

(54) ROADSIDE PERSONNEL SAFETY

(71) Applicant: Michael Auricchio, Dunellen, NJ (US)

(72) Inventor: Michael Auricchio, Dunellen, NJ (US)

( * ) Notice: Subject to any disclaimer, the term of this patent is extended or adjusted under 35 U.S.C. 154(b) by 95 days.

(21) Appl. No.: 18/675,049

(22) Filed: May 27, 2024

(51) Int. Cl.
*G08B 21/02* (2006.01)

(52) U.S. Cl.
CPC .................................... *G08B 21/02* (2013.01)

(58) Field of Classification Search
CPC .......... G02B 2027/0178; G02B 27/017; G02B 27/0093; G02B 2027/014; G02B 2027/0187; G02B 2027/0118; G02B 27/0172; G02B 5/30; G02B 2027/0138; G02B 27/0176; G02B 2027/0147; G02B 2027/0112; G02B 2027/0127; G02B 2027/0132; G02B 27/0149; G02B 5/18; G02B 6/12009; G02B 2027/011; G02B 2027/0123; G02B 2027/0134; G02B 2207/113; G02B 2207/115; G02B 5/23; G02B 5/3058; G02B 6/0038; G02B 6/0045; G02B 6/0053; G02B 6/0056; G02B 6/12019; G02B 7/008; G02B 5/04; G02B 5/1842; G02B 5/28; G06F 3/013; G06F 3/017; G06F 1/163; G06F 3/005; G06F 3/011; G06F 2218/12; G06F 3/03547; G06F 3/0415; G06F 13/00; G06F 3/012; G06F 3/014; G06F 3/0227; G06F 3/0346; G06F 3/0488; G06F 3/167; G06F 2203/0331; G06F 2203/0338; G06F 3/016; G06F 3/0304; G06F 3/0428; G06F 21/32; G06F 21/36; G06F 3/0233; G06F 3/0236; G06F 3/04842; G06F 3/14; G06F 3/165; G06Q 30/02; B60W 2540/22; B60W 2540/221; B60W 2540/229; B60W 2540/223; B60W 2540/225; B60W 40/08; B60W 2040/0818; B60W 2040/0872; B60W 2420/403; B60W 2540/043; B60W 2540/26; B60W 50/0098; B60W 2420/408; B60W 2420/54; B60W 2540/10; B60W 2540/12; B60W 2540/18;

(Continued)

(56) References Cited

U.S. PATENT DOCUMENTS 5,661,474 A 8/1997 Douglas
7,230,546 B1 * 6/2007 Nelson ................ G08G 1/0955
340/940

(Continued)

*Primary Examiner* — Daniel Previl
(74) *Attorney, Agent, or Firm* — Sanchelima & Associates, P.A.; Christian Sanchelima; Jesus Sanchelima

(57) ABSTRACT

A roadside personnel safety system including a body-worn device assembly. The body-worn device assembly includes a microcontroller, a sensor, lights, a speaker, and haptic motors embedded in a device housing. The sensor detects possible hazardous vehicles passing near a work zone/emergency zone. The microcontroller actuates the lights, the speaker and the haptic motors when a vehicle is detected by the sensor. The microcontroller has a GPS integrated to determine the location of a wearer. The microcontroller is in communication with passing vehicles to alert the passing vehicles about the work zone/emergency zone, emergency zone, police officers, or tow truck operators in a road. The (Continued)

body-worn device assembly is aided by a sensing assembly including sensors to aid the detection of hazardous vehicles passing near the work zone/emergency zone.

8 Claims, 3 Drawing Sheets

(58) Field of Classification Search
CPC .. B60W 2554/00; B60W 30/09; B60W 40/04; B60W 60/0051; B60W 2050/143; B60W 50/14; B60W 2540/21; B60W 2554/4029; B60W 2554/801; B60W 2554/802; B60W 2556/10; B60W 2756/10; B60W 60/0059; B60W 2556/45; B60W 50/087; B60W 2050/0075; B60W 2050/146; B60W 2540/215; B60W 2540/30; B60W 2710/30; B60W 2720/10; B60W 2754/30; B60W 30/182; B60W 50/16; G06V 20/597; G06V 10/764; G06V 10/82; G06V 40/15; G06V 40/45; G06V 40/70; G06V 20/20; G06V 40/166; B60K 28/02; B60K 28/06; B60K 28/066; B60R 25/25; B60R 2022/4858; B60R 22/48; G07C 5/02; G07C 5/08; G07C 9/00309; G07C 9/00563; G07C 9/37; G16H 50/20; G16H 40/20; G16H 50/30; G16H 40/63; G16H 40/67; G16H 80/00; G01B 11/026; G01B 11/26; G01B 15/00; G01S 13/878; G01S 15/08; G01S 15/42; G01S 17/08; G01S 2013/468; G01S 13/862; G01S 13/867; G01S 13/931; G01S 15/931; G01S 2013/9315; G01S 2013/9316; G01S 2013/9318; G01S 2013/93185; G01S 2013/9319; G01S 2013/93271; G01S 2013/93272; A61B 5/02055; A61B 5/14551; A61B 2562/0219; A61B 5/0205; A61B 5/021; A61B 5/02405; A61B 2560/0257; A61B 5/0022; A61B 5/02444; A61B 5/0533; A61B 5/11; A61B 5/1102; A61B 5/1118; A61B 5/6814; A61B 5/6822; A61B 5/72; A61B 5/7275; A61B 5/742; A61B 5/7475; A61B 5/02438; A61B 5/33; A61B 5/02108; A61B 5/02416; A61B 5/0531; A61B 5/14517; A61B 5/14532; A61B 5/14552; A61B 5/28; A61B 5/318; A61B 5/6803; A61B 5/681; A61B 5/746; A61B 2560/0252; A61B 3/113; A61B 5/02125; A61B 5/0816; A61B 5/257; A61B 5/332; A61B 5/352; A61B 5/369; A61B 5/384; A61B 5/389; A61B 5/398; A61B 5/4809; A61B 5/4812; A61B 5/4815; A61B 5/4818; A61B 5/4857; A61B 5/6815; A61B 5/721; A61B 5/002; A61B 5/01; A61B 5/024; A61B 5/08; A61B 5/1112; A61B 5/18; A61B 5/4094; A61B 5/486; A61B 5/6804; A61B 5/7455; A61B 5/747; G05D 1/0055; G05D 1/0231; G05D 1/0255; G05D 1/0257; G05D 1/0016; G05D 1/0214; G06T 19/006; G08G 1/16; G08G 1/096844; G08G 1/165; G08G 1/166; G08G 1/167; G08G 1/096716; G08G 1/09675; G08G 1/096783; G08G 1/00; G08G 3/00; G08G 5/00; G08G 7/00; G08G 9/00; G08G 99/00; F41A 17/08; F41A 1/00; F41A 3/00; F41A 5/00; F41A 7/00; F41A 9/00; F41A 11/00; F41A 13/00; F41A 15/00; F41A 17/00; F41A 19/00; F41A 21/00; F41A 23/00; F41A 25/00; F41A 27/00; F41A 29/00; F41A 31/00; F41A 33/00; F41A 35/00; F41A 99/00; F16C 32/0442; F16C 1/00; F16C 3/00; F16C 5/00; F16C 7/00; F16C 9/00; F16C 11/00; F16C 13/00; F16C 15/00; F16C 17/00; F16C 19/00; F16C 21/00; F16C 23/00; F16C 25/00; F16C 27/00; F16C 29/00; F16C 31/00; F16C 32/00; F16C 33/00; F16C 35/00; F16C 37/00; F16C 39/00; F16C 41/00; F16C 43/00; F16C 2202/00; F16C 2204/00; F16C 2206/00; F16C 2208/00; F16C 2210/00; F16C 2212/00; F16C 2220/00; F16C 2223/00; F16C 2226/00; F16C 2229/00; F16C 2231/00; F16C 2233/00; F16C 2235/00; F16C 2237/00; F16C 2240/00; F16C 2300/00; F16C 2310/00; F16C 2314/00; F16C 2316/00; F16C 2320/00; F16C 2322/00; F16C 2324/00; F16C 2326/00; F16C 2340/00; F16C 2350/00; F16C 2352/00; F16C 2360/00; F16C 2361/00; F16C 2362/00; F16C 2370/00; F16C 2380/00; G08B 13/19628; G08B 13/19697; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 25/00; G08B 26/00; G08B 27/00; G08B 29/00; G08B 31/00; H02K 7/09; H02K 1/00; H02K 3/00; H02K 5/00; H02K 7/00; H02K 9/00; H02K 11/00; H02K 13/00; H02K 15/00; H02K 16/00; H02K 17/00; H02K 19/00; H02K 21/00; H02K 23/00; H02K 24/00; H02K 25/00; H02K 26/00; H02K 27/00; H02K 29/00; H02K 31/00; H02K 33/00; H02K 35/00; H02K 37/00; H02K 39/00; H02K 41/00; H02K 44/00; H02K 47/00; H02K 49/00; H02K 51/00; H02K 55/00; H02K 53/00; H02K 99/00; H02K 2201/00; H02K 2203/00; H02K 2205/00; H02K 2207/00; H02K 2209/00; H02K 2211/00; H02K 2213/00; H02K 2215/00; H04N 7/183; H04N 1/00; H04N 3/00; H04N 5/00; H04N 7/00; H04N 9/00; H04N 11/00; H04N 13/00; H04N 17/00; H04N 19/00; H04N 21/00; H04N 23/00; H04N 25/00; H04N 2101/00; H04N 2201/00; H04N 2209/00; H04N 2213/00
USPC .... 340/425.5, 903, 573.1, 539.22, 905, 909, 340/917, 925, 994, 995.2, 995.19, 427, 340/436
See application file for complete search history.

(56) References Cited

U.S. PATENT DOCUMENTS 7,624,952 B1 * 12/2009 Bartek .................... B61L 23/06
246/477
2008/0134419 A1 * 6/2008 Kalaam .................... F41H 1/02
2/2.5

(56) References Cited

U.S. PATENT DOCUMENTS

| | | | | |
|---|---|---|---|---|
| 2009/0243883 | A1* | 10/2009 | Simon | G08G 1/096716 340/905 |
| 2015/0095251 | A1* | 4/2015 | Alazraki | G06Q 10/00 705/325 |
| 2016/0096538 | A1* | 4/2016 | Bartek | B61L 27/70 246/28 R |
| 2017/0127237 | A1* | 5/2017 | Hayee | G01S 19/51 |
| 2020/0126323 | A1* | 4/2020 | Ledoux | B60C 23/0479 |

* cited by examiner

ROADSIDE PERSONNEL SAFETY

BACKGROUND OF THE INVENTION

1. Field of the Invention

The present invention relates to roadside safety systems and, more particularly, to a roadside personnel safety system that enhances the safety of individuals in roadways by alerting of potential vehicle dangers. The roadside personnel safety system aims to reduce accidents and improve the overall safety of pedestrians, cyclists, first responders, tow operators, and workers in road construction zones.

2. Description of the Related Art

Several designs for roadside safety systems have been designed in the past. None of them, however, include a transmitter and receiver system where the transmitter has a sensor to detect hazardous vehicles near to a work zone/safety zone, the transmitter sends a signal to the receiver which is worn by a user to alert about the hazard.

Applicant believes that a related reference corresponds to U.S. Pat. No. 5,661,474 issued for a highway work zone intrusion alarm system which sounds a siren to warn highway workers in the event a vehicle enters a work zone so workers may react to errant vehicles in time to avoid injury, a warning alarm is activated by the pressure switch upon the compression of a sensing line when driven by an errant vehicle. Applicant believes that another related reference corresponds to U.S. Pat. No. 7,230,546 issued for a roadway incursion alert system including incursion detector units attached to safety icons such as traffic cones that generate alerts in response to impacts detected at the safety icons by an incursion detector and transmitted to one or more incursion receiver units. None of these references, however, teach of a roadside personnel safety system that has sensors to detect vehicles near to work zones/emergency zones or police officers, or tow truck operators, alerting the personnel about the vehicles approaching.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a roadside personnel safety system that has a body-worn device assembly that has sensors to detect hazardous vehicles near to work zones/emergency zones.

It is another object of this invention to provide a roadside personnel safety system that has a body-worn device assembly with an alarm system to alert emergency personnel, first responders, police officers, tow operators, and road workers about possible hazardous situations with vehicles.

It is still another object of the present invention to provide a roadside personnel safety system that is capable of predicting possible hazard situations based on the speed of the approaching vehicles.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
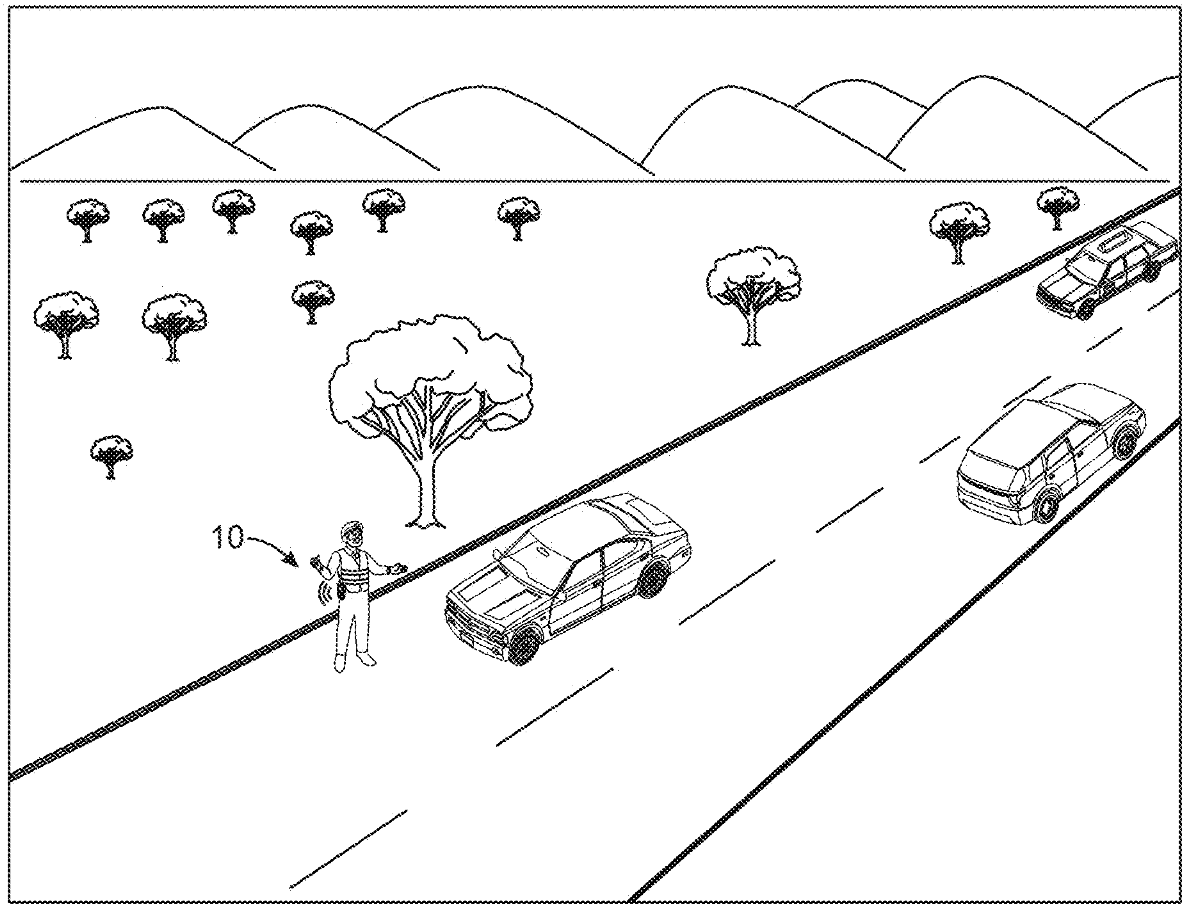
FIG. 1 represents an isometric operational view of the present invention 10 showing personnel wearing a body-worn device assembly 40 that alerts about the vehicles.
Figure 2:
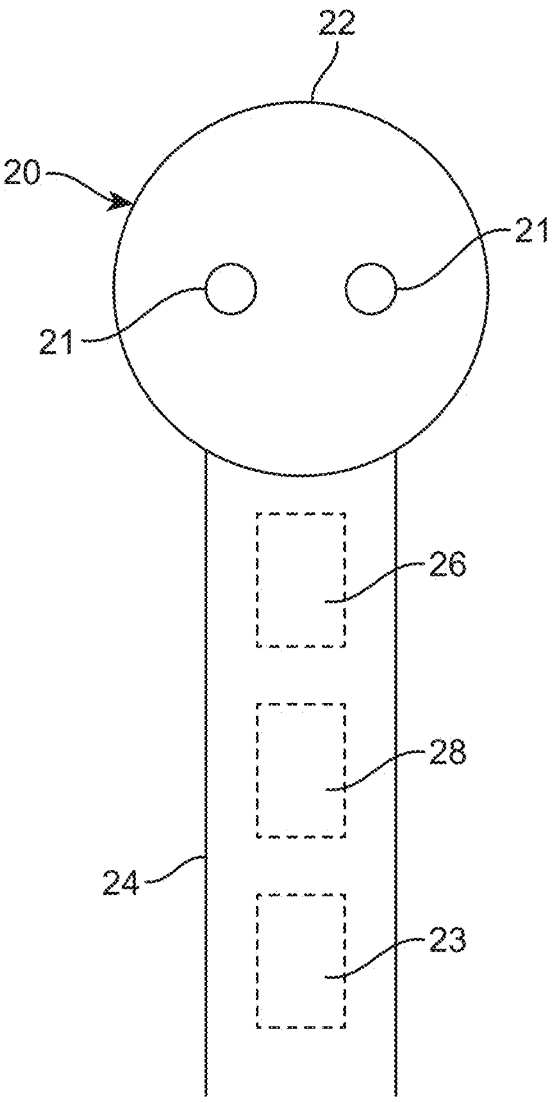
FIG. 2 shows a partial see-through view of the sensing assembly 20 showing a transmitter 26 embedded inside bottom housing 24 and the sensors 21 mounted to top housing 22.
Figure 3:
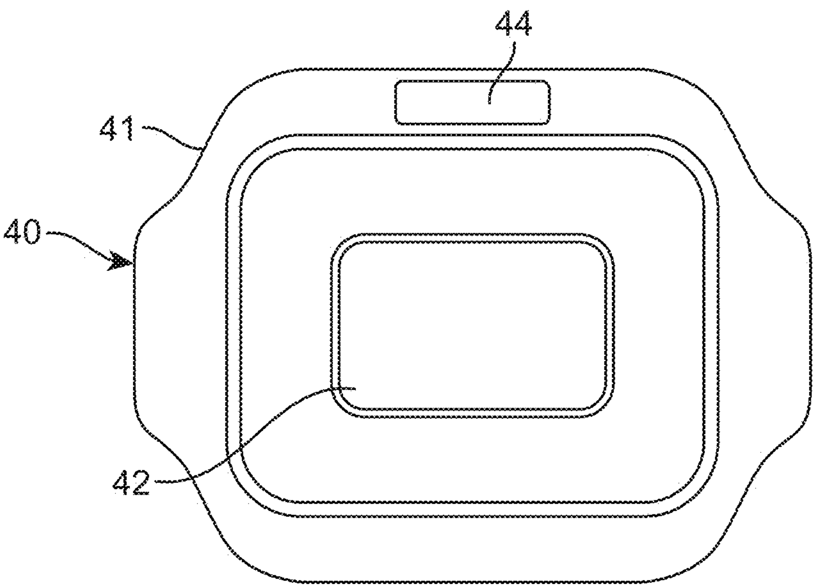
FIG. 3 illustrates a front view of the body-worn device assembly 40 showing the speakers 42 and the lights 44 embedded to the device housing 41.
Figure 4:
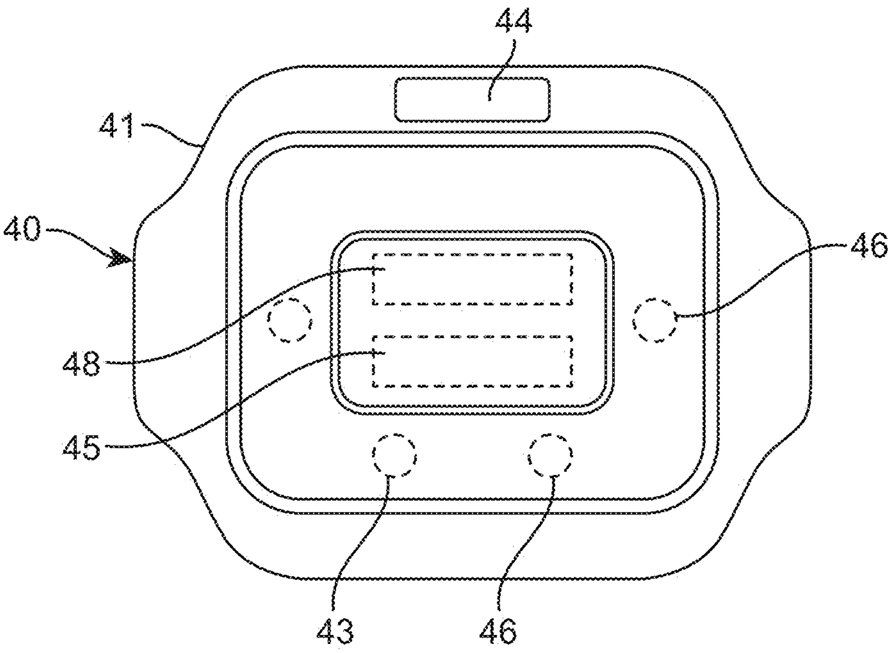
FIG. 4 is a representation of a see-through view of the body-worn device assembly 40 showing the microcontroller 48 embedded inside the device housing 41.

Referring now to the drawings, where the present invention is generally referred to with numeral 10, it can be observed that it basically includes a body-worn device assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The body-worn device assembly 40 may have a device housing 41. The device housing 41 may have any suitable shape. The device housing 41 may be ergonomic. The body-worn device assembly 40 may have a microcontroller 48, a sensor 43 haptic motors 46, speakers 42, and lights 44. The microcontroller 48 and haptic motors 46 may be embedded inside the device housing 41. The speakers 42 may be embedded on a surface of the device housing 41. The lights 44 may be placed on a surface of the device housing 41. The body-worn device assembly 40 may be powered by a battery 45 embedded in the device housing 41.

The microcontroller 48 may be a microcontroller with a GPS receiver to determine the location of a wearer. The microcontroller 48 may have wireless communication technology such as Bluetooth™, Wi-Fi™, or any other radio-based communication technology. The microcontroller 48 may be embedded along with a phone mobile card to include phone mobile connectivity to communicate with central monitoring system or other authorized personnel allowing remote monitoring, tracking, and communication with the user wearing the body-worn device assembly 40.

The microcontroller 48 may be programmed to determine a radius around the wearer based on the limit speed of the road. The sensor 43 may be a distance sensor such as optical sensors, ultrasonic sensors, or any other suitable sensor capable of detecting vehicles. The sensor 43 may be a LiDAR sensor. The microcontroller 48 may process the information from the sensor 43 to determine if there are hazardous vehicles on the radius around the wearer in a work zone/emergency zone. The sensor 43 may detect approaching vehicles and analyze the speed. The microcontroller 48 may be programmed to predict vehicle trajectories to detect possible hazardous scenarios. The microcontroller 48 may detect erratic movements. The microcontroller 48 may actuate the speakers 42, lights 44, and haptic motors 46 when a hazardous scenario is detected, thereby alerting the wearer. The body-worn device assembly 40 may alert the personnel from the hazard so they can move out of the work zone/emergency zone. The lights 44 may be strobe lights. The haptic motors 46 may be vibrating motors. The microcontroller 48 may be in wireless communication with the computer of passing vehicles to alert the vehicles about the construction site, emergency situation, police officers, tow truck operators, or the like. It should be understood that the present invention 10 may be used in work zone/emergency zones in the road and also in non-work zones/emergency zones in the roads by personnel such as police officers or tow truck operators. It also may be suitable for the microprocessor 28 to communicate with the GPS of the smartphones of the drivers to alert about the current road conditions, and thereby preventing hazardous situations.

It should be understood that the body-worn device assembly 40 may be used to detect possible hazardous vehicles around a work zone/emergency zone, a police officer, or a tow truck operator on a road. The body-worn device assembly 40 may alert the wearer about the hazardous scenario. The body-worn device assembly 40 may communicate with the passing vehicles to alert the presence of the wearer in the work zone/emergency zone. In other embodiments, the body-worn device assembly 40 may be used along with a sensing assembly 20 to enhance the detection of hazardous situations. The sensing assembly 20 allows the detection of vehicles near to work zone/emergency zones. In one of the preferred embodiments the sensing assembly 20 may include a housing. The housing may include a top housing 22 and a bottom housing 24. In one embodiment the top housing 22 may have substantially spherical shape. In other embodiments, the top housing 22 may have other shapes such as cylindrical, cuboid, or any other suitable shape. The bottom housing 24 may have a substantially cylindrical shape. The bottom housing 24 may be elongated. It should be understood that the bottom housing 24 may have other suitable shapes such as cuboid, polygonal prism, or the like. The top housing 22 and bottom housing 24 may be made of a plastic, a metal, or any other suitable material. The top housing 22 and bottom housing 24 may have a protecting coating to prevent the housing and interior from weather. The bottom housing 24 and top housing 22 may be hollow. The bottom housing 24 may be installed preferably in a vehicle.

The sensing assembly 20 further includes sensors 21 and transmitter 26. In one embodiment the sensors 21 may be located on the top housing 22. The sensors 21 may be located around an entire perimeter of the bottom housing 24 to have the sensors 21 sensing the surroundings in 360 degrees. It also may be suitable to implement a couple of sensors 21 and a rotational mechanism to allow the rotation of the sensors 21 to sense 360 degrees of the surroundings. In one embodiment, the sensors 21 may be distance sensors such as optical sensors, ultrasonic sensors, laser sensors, or any other suitable distance sensor. It also may be suitable to have the sensing assembly 20 with LIDAR sensors placed on the housing.

The sensors 21 may be electrically connected to a microprocessor 28. The microprocessor 28 may be embedded inside the bottom housing 24. The microprocessor 28 may process the information detected by sensors 21 to determine if there are hazardous vehicles nearby. The microprocessor 28 may be programmed to detect hazardous vehicles based on the distance and speed. The microprocessor 28 may be programmed to predict vehicle trajectories based on speed and distance, thereby predicting potential hazardous vehicles. The microprocessor 28 may be electrically connected to a transmitter 26. The transmitter 26 may electromagnetically transmit information of hazardous vehicles to the body-worn device assembly 40. The sensing assembly 20 may be in wireless communication with the body-worn device assembly 40 via the transmitter 26 and a receiver of the microcontroller 48 of the body-worn device assembly 40. In one embodiment, the transmitter 26 and the microcontroller 48 may communicate via Bluetooth™. The transmitter 26 and the microcontroller 48 may include any suitable means of wireless communication including WiFi™, Bluetooth™, or the like.

The microprocessor 28, sensors 21, and transmitter 26 may be powered by a battery 23. The battery 23 may be a rechargeable battery. The battery 23 may be embedded in the bottom housing 24. The sensing assembly 20 may be placed on law enforcement vehicles, construction vehicles, or the like. The sensing assembly 20 may detect vehicles that may be hazardous for the workers or personnel inside a working area in the road or in an emergency area such as a broken down vehicle. The microprocessor 28 may include GPS service to accurately determine the location. The location may be provided in real-time to the user and to other devices and systems for coordination. The microprocessor 28 may be in wireless communication with the computer of passing vehicles to alert the vehicles about the construction site, emergency situation, or the presence of police officers, tow truck operators or the like. It also may be suitable for the microprocessor 28 to communicate with the GPS of the smartphones of the drivers to alert about the current road conditions, and thereby preventing hazardous situations.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A roadside personnel safety system, comprising:

a. a body-worn device assembly including a device housing, a microcontroller, a sensor, haptic motors, a speaker and lights; said microcontroller, said sensor, and said haptic motors embedded inside said device housing, said speaker and said lights embedded on a surface of said device housing; wherein said sensor is a distance sensor, said sensor detects a passing vehicle near to a work zone/emergency zone; said microcontroller is programmed to determine a radius around a wearer based on a limit speed of a road, said microcontroller processes information from said sensor to determine if there are hazardous vehicles within said radius around said wearer; said microcontroller actuates said speaker, said haptic motors, and said lights when the passing vehicle is detected as hazardous; and b. said microcontroller has a receiver, said microcontroller with said receiver is configured to receive a signal transmitted by the transmitter from a sensing assembly; said microcontroller actuates said speaker, said haptic motors, and said lights when said signal is received from the transmitter; wherein said lights, said haptic motors, and said speaker are configured to alert a user.

2. The roadside personnel safety system set forth in claim 1 further including said sensing assembly, wherein said sensing assembly includes additional sensors and a transmitter, said sensing assembly includes a housing mounted on a vehicle near the work zone/emergency zone, said additional sensors distributed around said housing for 360-degree detection, and a microprocessor embedded in said housing to process data from said additional sensors before said transmitter transmitting a signal to the microcontroller of the body-worn device assembly when the additional sensors detect the passing vehicle near to the work zone/emergency zone.

3. The roadside personnel safety system set forth in claim 2, wherein the sensing assembly further includes a battery to power the transmitter and the sensors.

4. The roadside personnel safety system set forth in claim 2, wherein the sensing assembly is installed on a vehicle near to the work zone/emergency zone, said additional sensors are distance sensors configured to detect the passing vehicle based on distance and speed.

5. The roadside personnel safety system set forth in claim 4, wherein the additional sensors are LIDAR sensors.

6. The roadside personnel safety system set forth in claim 1, wherein the microcontroller includes a GPS receiver integrated therein to determine a location of the body-worn device assembly, said microcontroller configured to wirelessly transmit said location to a computer of the passing vehicle to alert the passing vehicle of the work zone/emergency zone and to share the location to other vehicles by sending said location to a computer of the other vehicles.

7. A roadside personnel safety system, comprising:

a. a sensing assembly including sensors, a battery, and a transmitter embedded in a housing, said sensing assembly is placed on a vehicle near a work zone/emergency zone in a road, said sensors are distance sensors configured to detect a passing vehicle based on distance and speed, said transmitter transmitting a signal when the sensors detect th passing vehicle near to the work zone/emergency zone, said battery powers the sensors and the transmitter; said sensors are distributed around said housing for 360-degree detection, and a microprocessor embedded in said housing to process data from said sensors before said transmitter transmits the signal; and b. a body-worn device assembly including a device housing, a device sensor, a second battery, a receiver, haptic motors, a speaker and lights, wherein said device sensor is a distance sensor integrated into said device housing, said device sensor configured to measure speed and distance of the passing vehicle, said lights are strobe lights, said receiver receives the signal transmitted by the transmitter, said speaker, said haptic motors, and lights are activated when the signal is received, said lights, said haptic motors, and said speaker are configured to alert a user, said receiver, said haptic motors, said lights, said speaker and said second battery are embedded in the device housing, said second battery power the lights, the receiver, the speaker, and the haptic motors, said second battery is a rechargeable battery, wherein the device sensor detects the passing vehicles, said device sensor actuates the haptic motors, the speaker and the lights when the passing vehicles are detected.

8. A roadside personnel safety system, consisting of:

a. a sensing assembly including a housing comprising a top housing and a bottom housing, said top housing having a substantially spherical shape, said bottom housing having a substantially cylindrical shape, said bottom housing being elongated, sensors, a microprocessor, a battery, and a transmitter embedded in said housing, said sensors mounted to said top housing, said microprocessor, said transmitter, and said battery embedded inside said bottom housing, said microprocessor electrically connected to said sensors and to said transmitter, said sensing assembly is placed in a vehicle near to a work zone/emergency zone in a road, said sensors are distance sensors, said microprocessor processes information detected by said sensors to determine if there are hazardous vehicles nearby based on distance and speed, said microprocessor is programmed to predict vehicle trajectories based on speed and distance, said transmitter transmitting a signal when the sensors detect a passing vehicle near to the work zone/emergency zone, said battery powers the sensors, the microprocessor, and the transmitter; and b. a body-worn device assembly including a device housing, said device housing having an ergonomic shape, a device sensor, a microcontroller, a second battery, a receiver, haptic motors, a speaker and lights, said lights are strobe lights, said microcontroller, said device sensor, said receiver, said haptic motors, said speaker, said lights, and said second battery embedded in said device housing, said microcontroller electrically connected to said device sensor and to said receiver, said microcontroller is programmed to determine a radius around a wearer based on a limit speed of the road, said microcontroller processes information from said device sensor to determine if there are hazardous vehicles within said radius around said wearer, said microcontroller actuates said haptic motors, said speaker, and said lights when said device sensor detects passing vehicles as hazardous, said receiver receives the signal transmitted by the transmitter, said speaker, said haptic motors, and lights are activated when the signal is received, said lights, said haptic motors, and said speaker are configured to alert a user, said second battery powers the lights, the receiver, the speaker, and the haptic motors, said second battery is a rechargeable battery.

* * * * *